United States Patent
Abu-Samaha et al.

(10) Patent No.: US 7,958,247 B2
(45) Date of Patent: Jun. 7, 2011

(54) HTTP PUSH TO SIMULATE SERVER-INITIATED SESSIONS

(75) Inventors: Mamoun Abu-Samaha, Cupertino, CA (US); Vivek Kapadekar, Rancho Bernardo, CA (US); Samuel Wu, Rancho Bernardo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 12/251,302

(22) Filed: Oct. 14, 2008

(65) Prior Publication Data

US 2010/0094985 A1    Apr. 15, 2010

(51) Int. Cl.
*G06F 15/16* (2006.01)
*G06F 15/173* (2006.01)

(52) U.S. Cl. ........ 709/228; 709/203; 709/219; 709/224; 709/227

(58) Field of Classification Search .................. 709/203, 709/207, 223, 224; 719/318; 713/153
See application file for complete search history.

(56) References Cited

U.S. PATENT DOCUMENTS

| | | | |
|---|---|---|---|
| 6,944,760 B2 * | 9/2005 | Wills | 713/153 |
| 2004/0181604 A1 | 9/2004 | Immonen | |
| 2005/0064884 A1 | 3/2005 | Dumont et al. | |
| 2005/0149564 A1 | 7/2005 | Jain et al. | |
| 2006/0072721 A1 * | 4/2006 | Wisniewski | 379/88.22 |
| 2006/0129628 A1 * | 6/2006 | Kamiya et al. | 709/203 |
| 2009/0307715 A1 * | 12/2009 | Santamaria et al. | 719/318 |

* cited by examiner

*Primary Examiner* — Quang N. Nguyen

(57) ABSTRACT

A mobile device apparatus uses an HyperText Transfer protocol (HTTP) push operation to simulate server-initiated sessions. The illustrative mobile device apparatus comprises a push server logic operable in a push server that sends a message to a mobile device over a network. The push server logic is configured to receive a GET command from a mobile device. The GET command includes a mobile device identifier parameter and a timeout parameter designating a maximum time interval for the push server to reply with a message. The push server logic holds a GET command session until expiration of a timeout designated by the timeout parameter in a condition that no message is targeted to the mobile device. The push server logic terminates the GET command session by sending a message immediately in a condition that the message is targeted to the mobile device.

18 Claims, 12 Drawing Sheets

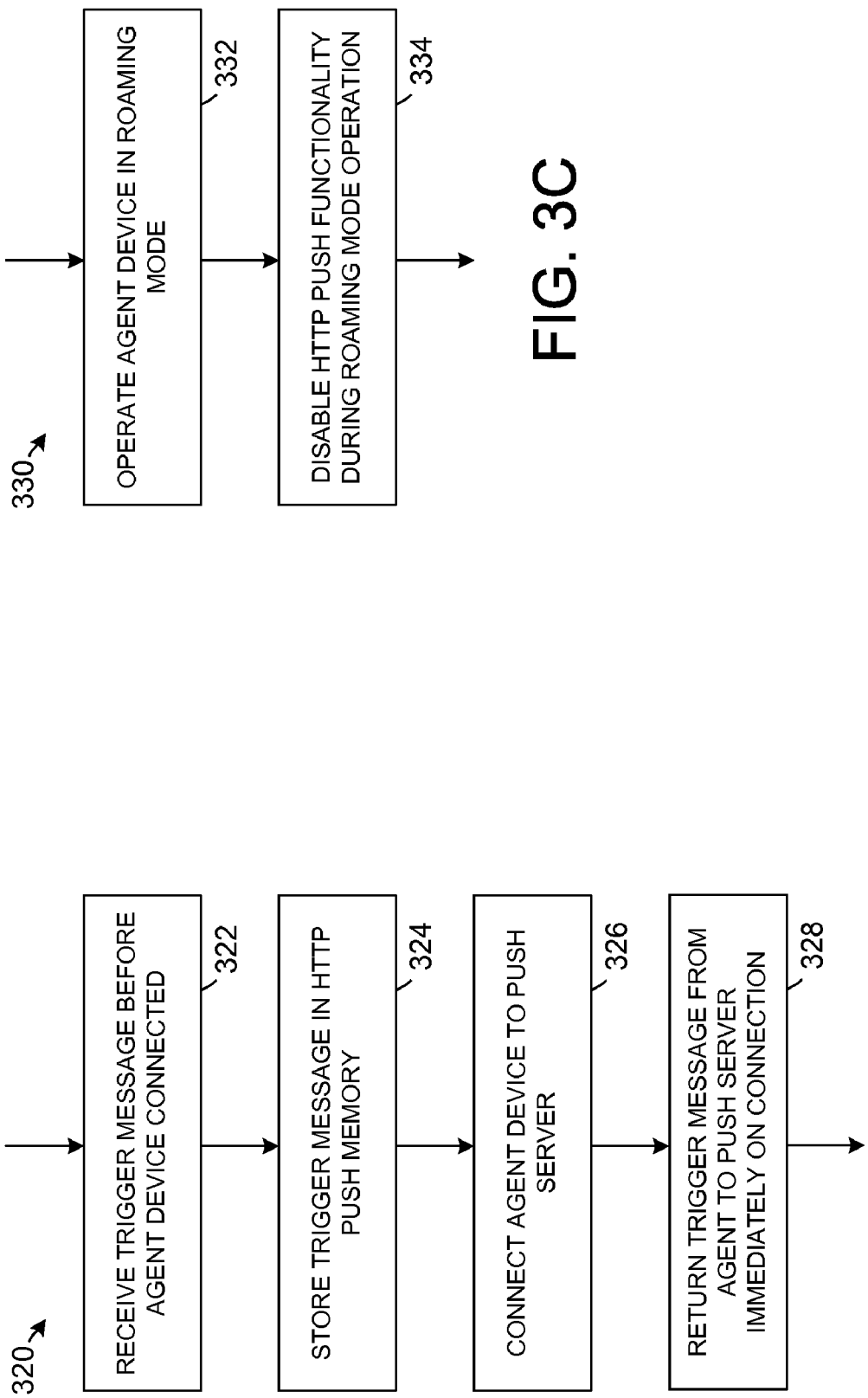

| STATE | EVENT | CONDITION | ACTION | NEXT STATE |
|---|---|---|---|---|
| IDLE | RUN COMMAND | NETWORK DISCONNECT & ACTIVE MODE | TURN ON GPRS | R1N0 |
| IDLE | RUN COMMAND | NETWORK DISCONNECT | | R1N0 |
| IDLE | RUN COMMAND | NETWORK CONNECT | START RECEIVERS | R1N1 |
| IDLE | EXIT COMMAND | | EXIT | |
| R1N0 | STOP COMMAND | | | IDLE |
| R1N0 | GPRS REGISTERED | ACTIVE MODE & NETWK DISCONNECTED | TURN ON GPRS | R1N0 |
| R1N0 | NETWK CONNECTED | | START RECEIVERS | R1N1 |
| R1N0 | EXIT COMMAND | | EXIT | |
| R1N1 | STOP COMMAND | | STOP RECEIVERS | |
| R1N1 | NETWORK DISCONNECTED | ACTIVE MODE | STOP RECEIVERS AND TURN ON GPRS | R1N0 |
| R1N1 | NET DISCONNECTED | | STOP RECEIVERS | R1N0 |
| R1N1 | NET UNAVAILABLE | | STOP RECEIVERS | R1N1 |
| R1N1 | NETWK AVAILABLE | | START RECEIVERS | R1N1 |
| R1N1 | MESSAGE RECEIVED | | PROCESS MESSAGE | R1N1 |
| R1N1 | GPRS UNREGISTERED | CURRENT CONNECTION IS GPRS | STOP RECEIVERS | R1N0 |
| R1N1 | EXIT COMMAND | | STOP RECEIVERS AND EXIT | |

FIG. 6

HTTP PUSH TO SIMULATE SERVER-INITIATED SESSIONS

BACKGROUND

Short Message Service (SMS) is a communications protocol allowing interchange of short text messages between mobile telephone devices. SMS text messaging is a widely used data application on the planet, with billions of active users and a high percentage of mobile phone subscribers sending and receiving text messages. SMS technology facilitates development and growth of text messaging. The connection between the phenomenon of text messaging and the underlying technology is so great that in parts of the world the term "SMS" is used as a synonym for a text message or the act of sending a text message, even when a different protocol is used.

SMS has disadvantages including lack of support for non-telephone devices such as personal digital assistants (PDAs) and operating cost due to SMS charges. Furthermore, SMS does not guarantee either delivery or delivery at a specified time.

Server-initiated communication sessions have traditionally been restricted to mobile phones and devices with SMS available or require the knowledge of the Internet Protocol (IP) address of the client. Non-telephone devices without SMS clients or with unknown IP addresses are difficult to access and manage from the server. Dependency on SMS also imposes additional charges (SMS charges) for each new session. Knowledge of the IP address requires a protocol such as Transport Control Protocol (TCP) or User Datagram Protocol (UDP) to allow the server to initiate a communication such as a management session with the device. Even when the IP address is known, SMS-type functionality can require that a heavy-type client is monitoring the protocols and, in most communications, will fail if the device is behind a firewall or if a router interposed between the server and client uses network address translation. If a device is connected to the server using a peer-to-peer network through a serial cable, Universal Serial Bus (USB), Bluetooth serial cable, infrared link, or the like, the server has difficulty reaching a heavy-type client without using an HTTP Push protocol.

SUMMARY

Embodiments of a mobile device apparatus use a Hyper-Text Transfer protocol (HTTP) push operation to simulate server-initiated sessions. The illustrative mobile device apparatus comprises a push server logic operable in a push server that sends a message to a mobile device over a network. The push server logic is configured to receive a GET command from a mobile device. The GET command includes a mobile device identifier parameter and a timeout parameter designating a maximum time interval for the push server to reply with a message. The push server logic holds a GET command session until expiration of a timeout designated by the timeout parameter in a condition that no message is targeted to the mobile device. The push server logic terminates the GET command session by sending a message immediately in a condition that the message is targeted to the mobile device.

BRIEF DESCRIPTION OF THE DRAWINGS

Embodiments of the invention relating to both structure and method of operation may best be understood by referring to the following description and accompanying drawings:

FIGS. 3A through 3F are flow charts illustrating one or more embodiments or aspects of a computer-executed method for simulating server-initiated sessions using a Hypertext Transfer Protocol (HTTP) push function;

FIG. 6 is a state table showing events and actions of the state manager of a push agent embodiment.

DETAILED DESCRIPTION

Figure 1A:
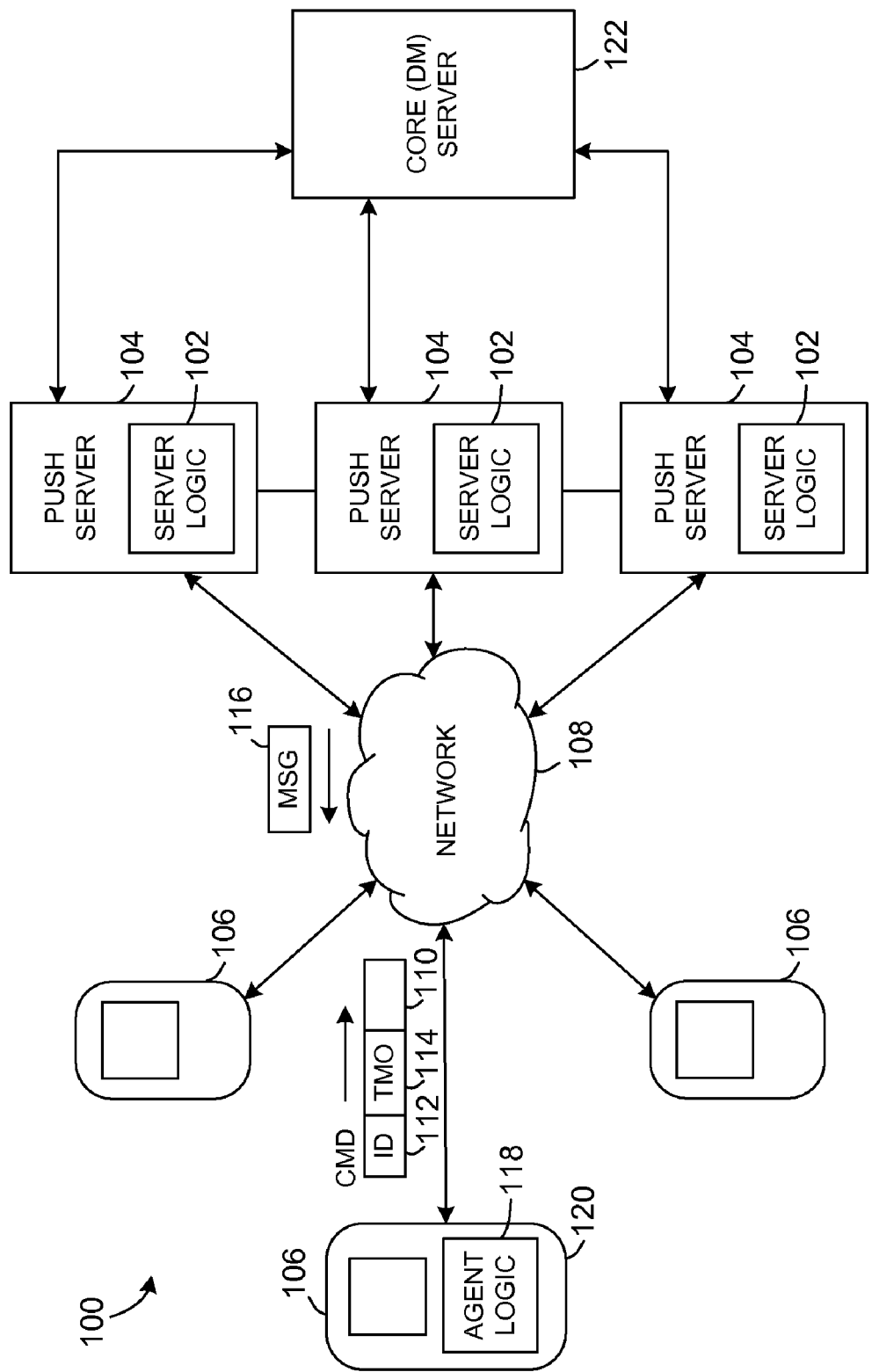
FIGS. 1A and 1B are schematic block diagrams depicting embodiments of a mobile device apparatus that uses Hyper-Text Transfer protocol (HTTP) push operation to simulate server-initiated sessions.

Embodiments of systems and methods enable HTTP Push functionality to simulate server-initiated sessions and eliminate Short Message Service (SMS) dependency.

An HTTP Push gateway is introduced that enables elimination of current dependency on SMS for mobility agent-enabled devices and supports non-telephone devices, which do not support SMS functionality. The illustrative HTTP Push gateway uses HTTP Push functionality to deliver smart start messages from a mobility manager to mobile devices.

The HTTP Push gateway and associated techniques support management of non-telephone devices such as personal digital assistants (PDAs), set-top boxes, gaming consoles, home routers or gateways, Internet Protocol Television (IPTV), and the like. The HTTP Push gateway and associated techniques can also eliminate dependency on SMS for message notifications, and reduces cost of an operating communication services, for example by reducing or eliminating SMS charges.

The illustrative HTTP Push gateway and associated techniques also enable management and control of a device that is agnostic to the technology in terms of connectivity and topology. In terms of connectivity, the illustrative HTTP Push gateway supports, for example, General Packet Radio Service (GPRS), Wi-Fi, Worldwide Interoperability for Microwave Access (WiMAX), peer-to-peer devices, future technologies which do not support SMS. In terms of topology, the illustrative HTTP Push gateway supports, for example, home networks behind firewalls wherein network address translation is present.

The depicted HTTP Push gateway and associated techniques also enable embedding of different commands and different command protocols. For example, HTTP push can be used to enhance Open Mobile Alliance (OMA) Device Management (OMA-DM) protocol. In other deployments, the HTTP Push gateway technology can be used to enhance standards such as WiMAX, Technical Report-069 (TR069), or other standards for managing networks such as a home network.

For example, in an enterprise application of device management, SMS is not an acceptable means to initialize a DM session. A better technique is proposed herein to send a notification quickly to device through GPRS and Wi-Fi.

The connection is maintained by the Push Agent running on mobile devices. The Push Agent sends a GET command to a server with a timeout parameter which informs the server a time after which a reply message must be sent. The server holds the GET session until the timeout period expires when no message is available for the client, and then sends a heartbeat message to the agent. When a message is coming for the device, the server stops the holding of the GET session by sending the message immediately. The client repeatedly sends GET commands to the server to maintain a capability to receive a PUSH immediately.

Illustrative systems and methods for HTTP Push functionality can implement a Push Agent as a program for a mobile device running in background that accepts a message from a server immediately over the internet. In a specific implementation, a Push Agent can be implemented for Windows Mobile devices or devices operating under any suitable operating system.

In an example implementation, a process operates in a communication cycle and a mobile agent in a mobile device sends to a new system component called "HTTP Push server" an HTTP request that includes a device ID and a timeout duration as parameters. The HTTP Push server either holds open HTTP connections with all devices until the timeout expires or is interrupted by a notification request from a push server. If no messages are targeted for the mobile device of the mobile agent during the heartbeat interval designated by the timeout duration, then the server simply sends an empty body. However if a message is targeted to the mobile device, the push server interrupts the HTTP Push gateway and the gateway returns the smart start message to the mobile device and finishes the request processing. In the case that the smart start message is returned, the mobility agent starts a device management session with an appropriate device management server. If possible according to connectivity of the mobile device, the mobile agent should repeat each timeout-defined cycle with the same HTTP connection, operative as a "Keep-Alive" transmission.

If the push server sends a start message before the device connects to the server, the message is stored in a push server memory. When the mobile device connects to the push server, the associated mobile agent returns the stored message immediately.

The mobile agent can automatically disable HTTP Push functionality when the mobile device is in roaming mode.

Referring to FIG. 1A, a schematic block diagram depicts an embodiment of a mobile device apparatus 100 that uses HyperText Transfer protocol (HTTP) push operation to simulate server-initiated sessions. The illustrative mobile device apparatus 100 comprises a push server logic 102 operable in a push server 104 that sends a message to a mobile device 106 over a network 108. The push server logic 102 is configured to receive a GET command 110 from a mobile device 106. The GET command 110 includes a mobile device identifier parameter 112 and a timeout parameter 114 designating a maximum time interval for the push server 104 to reply with a message 116. The push server logic 102 holds a GET command session until expiration of a timeout designated by the timeout parameter 114 in a condition that no message is targeted to the mobile device 106. The push server logic 102 terminates the GET command session by sending a message 116 immediately in a condition that the message 116 is targeted to the mobile device 106.

In some embodiments, the mobile device apparatus 100 can further comprise a push agent logic 118 operable in a mobile device 106 that accepts a message 116 from the push server 104 over the network 108. The push agent logic 118 is configured to send a GET command 110 to the push server 104 that includes a mobile device identifier parameter 112 and a timeout parameter 114 designating a maximum time interval for the push server 104 to reply with a message. The push agent logic 118 sends the GET command 110 repeatedly to the push server 104 to maintain a capability to receive a PUSH from the push server 104 immediately.

In an example implementation, the push agent logic 118 can execute as a background operation that immediately accepts the message from the push server 104 over the network 108 through General Packet Radio Service (GPRS), Wi-Fi, Universal Serial Bus (USB), and the like.

In an example implementation, the push server logic 102 can receive an HTTP request from a sending agent device 120 specifying parameters including a device identifier (ID) of the sending agent device 120 and a timeout specifier, and hold open HTTP connections of all of the plurality of mobile devices 106 including the sending agent device 120 until either the timeout is expired or interruption by a notification request from the push server 104. The push server logic 102 sends an empty body if no messages are present for the sending agent device 120 during the timeout interval and receives an interrupt from the push server 104 if a message is present for the agent device 120. The push server logic 102 responds to the interrupt by returning a trigger message to the agent device 120 and completing HTTP request processing.

The push server logic 102 can be configured so that if the trigger message is received before the agent device 120 is connected to the push server 104, the push server logic 102 stores the trigger message in an HTTP push memory, connects the agent device 120 to the push server 104, and returns the stored trigger message from agent device 120 to the push server 104 immediately upon connection.

The push agent logic 118 configured to respond to the trigger message at the agent device 120 by starting a device management session with a device management server 122, which can also be called a core server 122, and repeating all of multiple message cycles with a same HTTP connection for maintaining a connection at the agent device 120. The push agent logic 118 can operate the agent device 120 in a roaming mode and disable HTTP push functionality when the agent device 120 is operated in the roaming mode.

The mobile device apparatus 100 can further comprise at least one push server 104 that includes the push server logic 102.

The mobile device apparatus 100 can further comprise the mobile device 106 which includes the push agent logic 118.

An arrangement of a communication system can facilitate operations during heavy load conditions. A mobile device apparatus 100 can comprise multiple HTTP Push servers 104 with communications scaled to address the load conditions. One technique for configuring more than one physical HTTP Push server 104 to meet a heavy load conditions uses a first approach to connect to the servers 104 from a mobile device 106. The mobile agent 118 retains information relating to the array of push servers 104 that can be accessed and can randomly choose a push server 104 for connection. If the chosen push server 104 is busy, then the mobile agent 118 attempts to connect to another server.

The illustrative HTTP Push server 104 can operate in a distributed and modular manner, and thus can run independently of the associated push-enabled application. The push server 104 can be scaled both up and down without dependency on the application server. For example, HTTP push for Enterprise Message Service (EMS) can be implemented with a standalone server such as Apache Tomcat server in combination with an application such as EMS/Mobile to Mobile Convergence (MMC) which connects to the HTTP push server. Apache Tomcat is a Servlet container developed by Apache Software Foundation that implements the Java Servlet and JavaServerPages (JSP) specifications, and produces a Java HTTP web server environment for running Java code. In another configuration, both the HTTP push server and application server can run from the same computer or system. Standard Web technologies can be used for scaling and load balancing techniques.

The push server 104 is independent of the application server, for example an EMS backend, in the sense that the push server does not make any calls on the core application, and thus can only monitor calls from the application server. The push server 104 executes independently and can be scaled independently of the backend core server. However, in the absence of the backend core the HTTP push server 104 can only hold device connections and is unable to push notifications. The backend core triggers the push. For a backend server that does not trigger the push, for example other than EMS backend, the backend server notifies the push server 104 to send a push message, which is delivered by the push server 104.

Figure 1B:
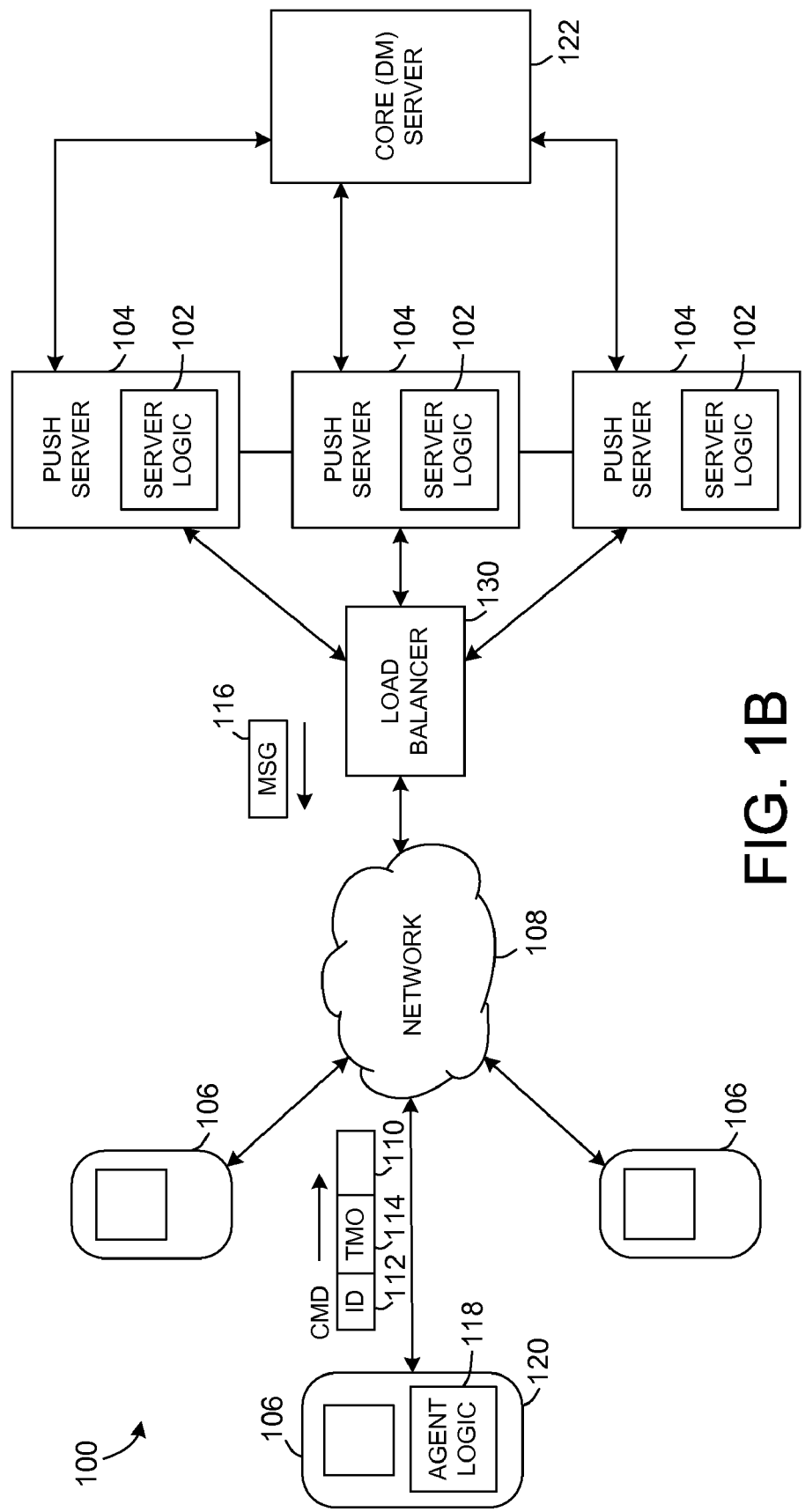

Referring to FIG. 1B, a schematic block diagram shows another embodiment of a communication system that facilitates operations during heavy load conditions. In a second approach for configuring more than one physical HTTP Push server 104 to meet a heavy load conditions, a load balancer 130 can be positioned between the mobile device 106 and the servers 104. In the second approach a mobile agent 118 can operate while retaining information of only a single gateway Uniform Resource Locator (URL), that of the load balancer switch 130. In operation, the mobile device 106 associated with the mobile agent 118 connects to a first server 104A. The first server 104A waits for a timeout. The mobile device 106 disconnects but the first server 104A retains device information in memory until an exception after timeout. The device 106 connects to a second server 104B. A core server 122, when sending a message, notifies all HTTP Push servers 104 in the group. A condition may occur that a message is not delivered to the agent 118, even when sent by the core server 122 without any exceptions. When the core or device management server 122 receives the message and starts a device management session, the core server 122 again notifies all HTTP Push servers 104 to remove stored messages for the device 106. The core server 122 again connects to the HTTP push server 104, and the device management session finishes.

The embodiments of a mobile device apparatus 100 enable several benefits including saving on SMS charges that would be levied on each session, management of non-telephone devices, and flexible operations for enterprises that work primarily on HTTP ports with no need for opening new and/or additional ports.

Figure 2:
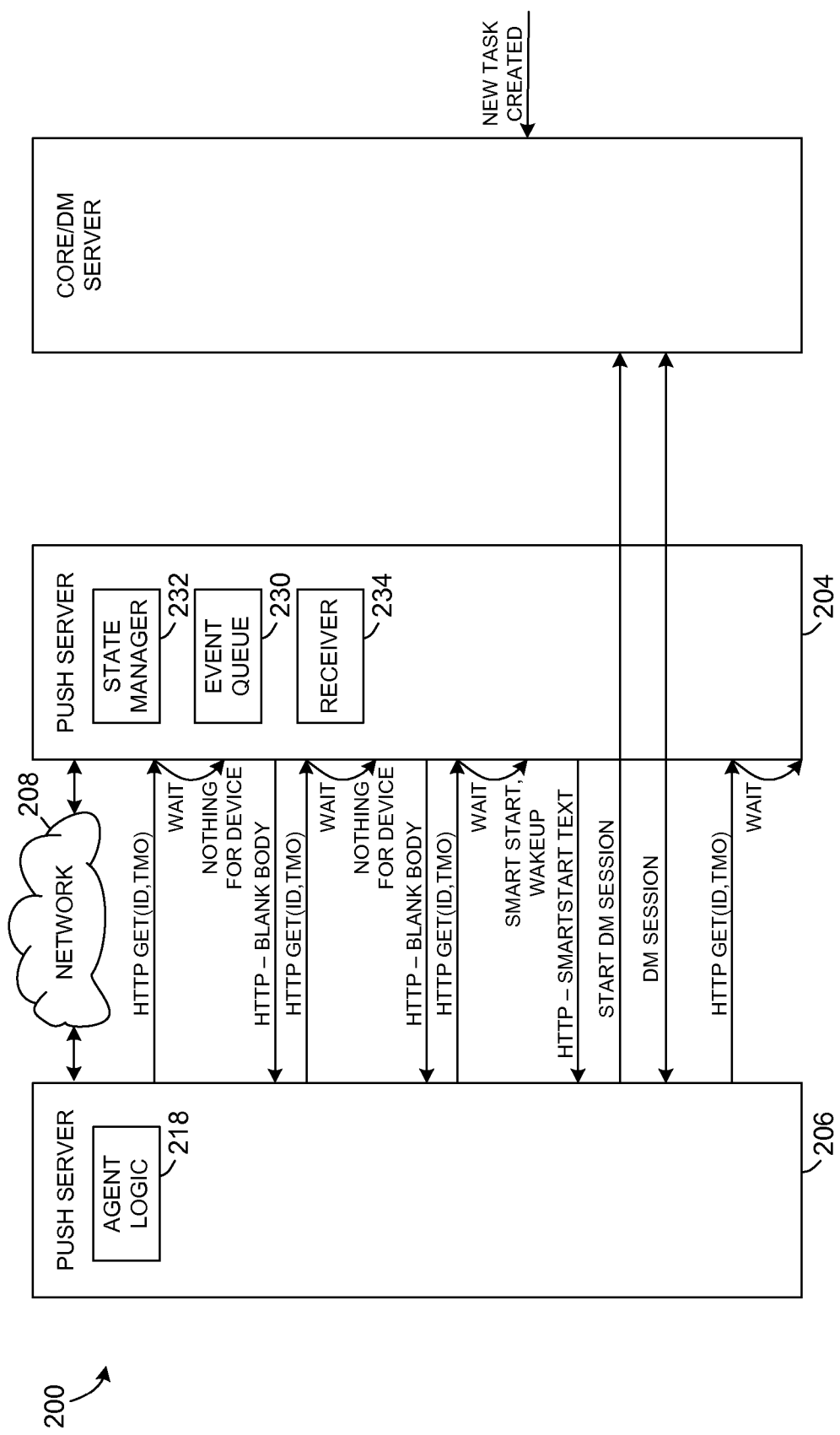
FIG. 2 is a schematic block diagram showing another embodiment of a mobile device apparatus that executes in a mobile device and uses a HTTP push operation to simulate server-initiated sessions.

Referring to FIG. 2, a schematic block diagram depicts another embodiment of a mobile device apparatus 200 that can use a HTTP push operation to simulate server-initiated sessions. The illustrative mobile device apparatus 200 comprises a push agent logic 218 for execution in a mobile device 206 that accepts a message from a server 204 over a network 208. The push agent logic 218 is configured to send a GET command to the server 204 including a mobile device identifier parameter and a timeout parameter designating a maximum time interval for the server to reply with a message. The push agent logic 218 sends the GET command repeatedly to the server 204 to maintain a capability to receive a PUSH from the server immediately.

The push agent logic 218 can execute in the background and immediately accept the message from the server 204 over the network 208 through an interface such as General Packet Radio Service (GPRS), Wi-Fi, Universal Serial Bus (USB), and others.

In some embodiments, the mobile device apparatus 200 can further comprise the mobile device 206 which incorporates and executes the push agent logic 218.

In an example implementation, the push agent logic 218 can comprise an event queue 230 and a state manager 232 that processes events in the event queue 230 and is inactive in a condition of no event on the event queue. The state manager 232 can also operate to establish a network connection and manage at least one message receiver to receive a push message. The push agent logic 218 can further comprise at least one receiver 234 that independently communicates with the server 204, connects to the server 204 identified by the state manager 232, posts a received message to the state manager 232, and waits for a command from the state manager 232.

Figure 3A:
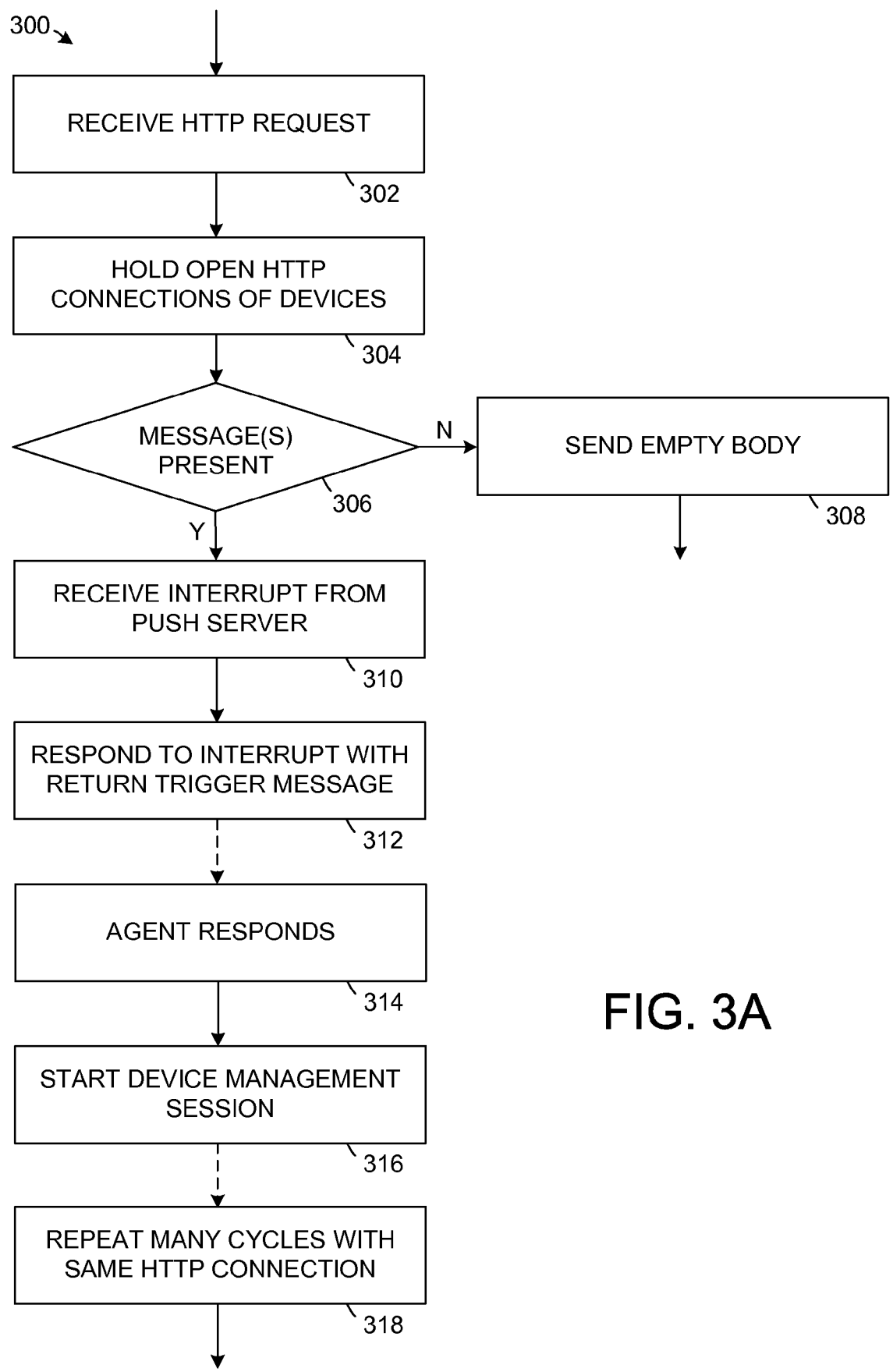

Referring to FIGS. 3A through 3F, flow charts illustrate one or more embodiments or aspects of a computer-executed method for simulating server-initiated sessions using a Hypertext Transfer Protocol (HTTP) push function. FIG. 3A depicts a computer-executed method 300 for performing a Hypertext Transfer Protocol (HTTP) push function comprising receiving 302 an HTTP request specifying parameters including a device identifier (ID) of a sending agent device and a timeout specifier, and holding open 304 HTTP connections of all of a plurality of devices including the sending agent device until either the timeout is expired or interruption by a notification request from a push server. If no messages are present 306 for the sending agent device during the timeout interval, an empty body is sent 308. However if a message is present for the agent device 306, an interrupt is received 310 from the push server. The method 300 further comprises responding 312 to the interrupt by returning a trigger message to the agent device and completing HTTP request processing.

The agent device can respond 314 to the trigger message by starting 316 a device management session with a device management server.

All of multiple of message cycles can be repeated 318 with a same HTTP connection for maintaining a connection at the agent device.

Referring to FIG. 3B, an embodiment of a computer-executed method 320 for performing a HTTP push function can further comprise, for a condition that the trigger message is received 322 before the agent device is connected to the push server, storing 324 the trigger message in an HTTP push memory. The method 320 further comprises connecting 326 the agent device to the push server, and returning 328 the stored trigger message from agent device to the push server immediately upon connection.

An embodiment of a computer-executed method 330 for performing a HTTP push function can further comprise, as depicted in FIG. 3C, operating 332 the agent device in a roaming mode, and disabling 334 HTTP push functionality when the agent device is operated in the roaming mode.

Figure 3D:
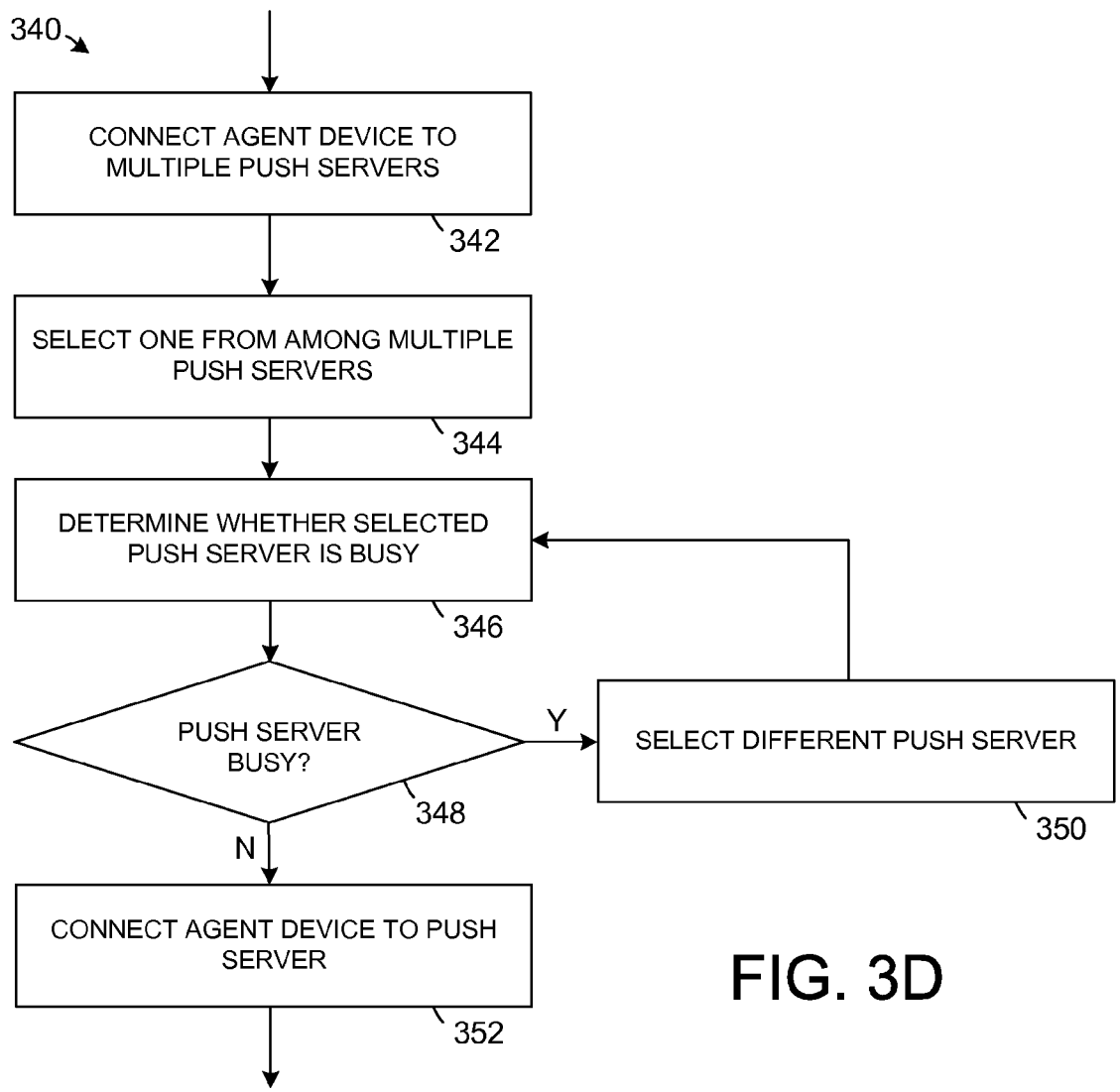

Referring to FIG. 3D, an embodiment of a computer-executed method 340 for performing an HTTP push function can comprise connecting 342 the agent device to a plurality of push servers comprising randomly selecting 344 from among the plurality of push servers, and determining 346 whether the selected push server is busy. If the selected push server is busy 348, a different push server is selected 350. If the selected push server is not busy 348, the method 340 comprises connecting 352 to the selected push server.

Figure 3E:
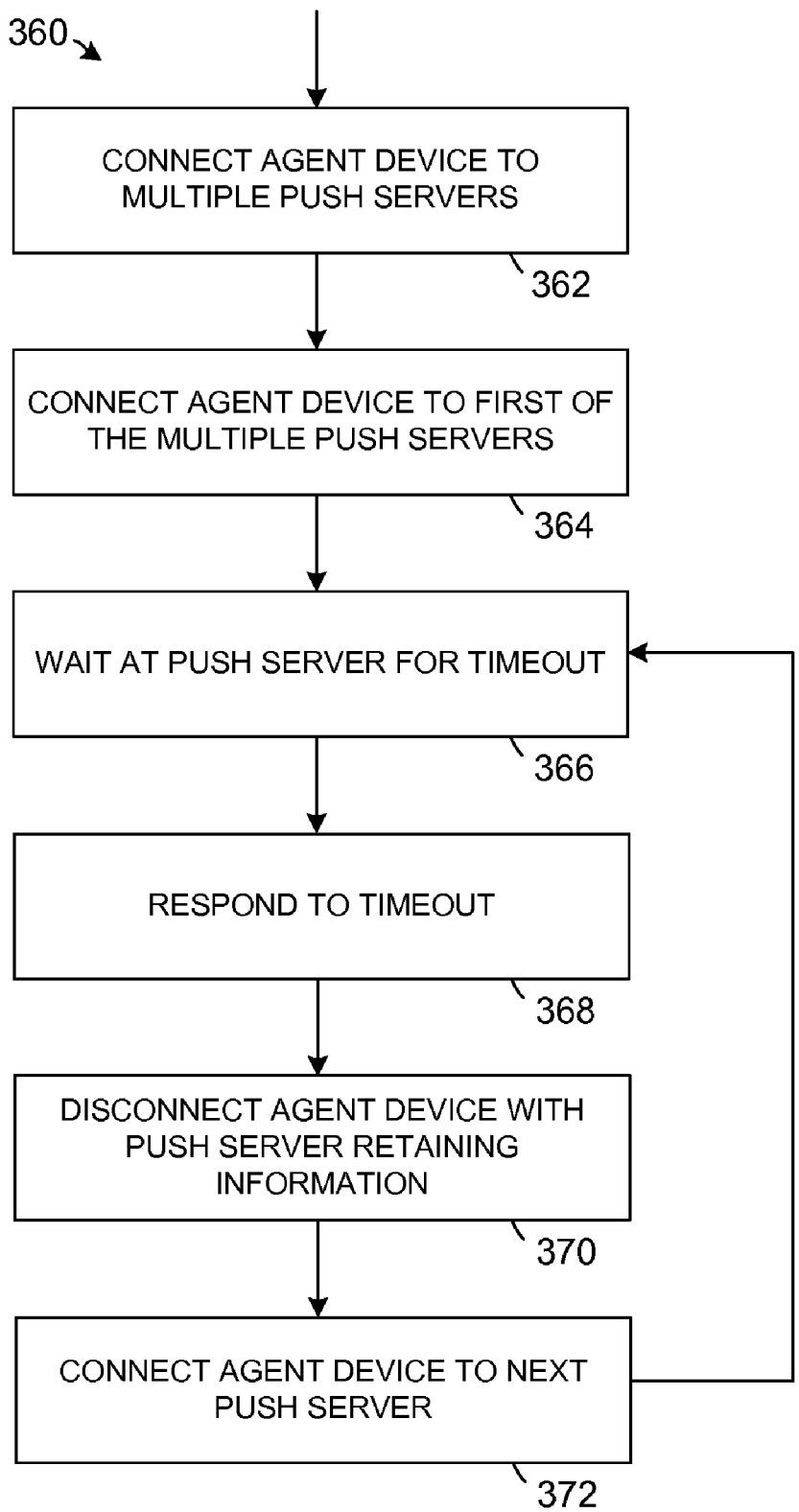

Referring to FIG. 3E, an embodiment of a computer-executed method 360 for performing an HTTP push function can comprise connecting 362 the agent device to a plurality of push servers. The agent device can be connected 362 by connecting 364 the agent device to a first push server of the plurality of push servers, and waiting 366 at the first push server for the timeout. In response 368 to the timeout, the agent device is disconnected 370 with the first push server maintaining agent device information in memory until an exception after the timeout. The agent device is connected 372 to a next push server until a free server is found.

Figure 3F:
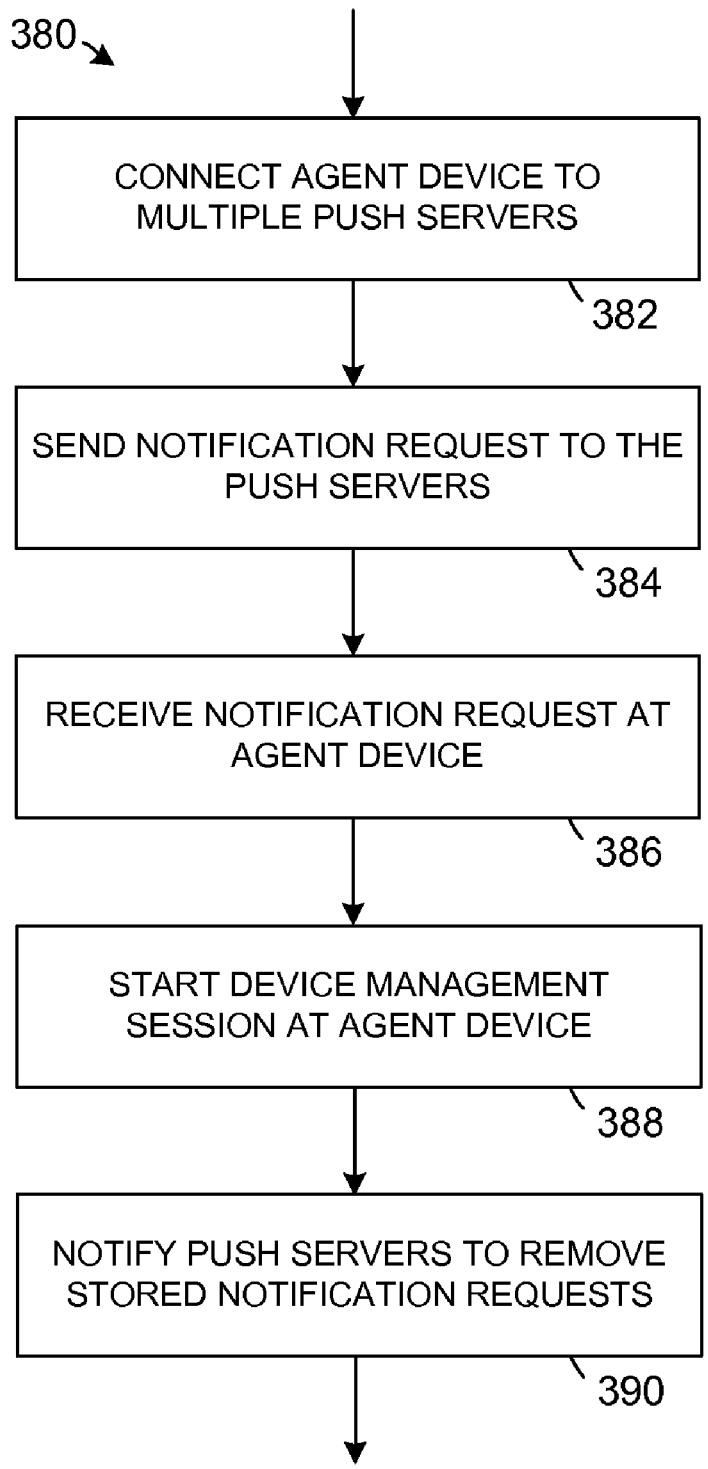

Referring to FIG. 3F, an embodiment of a computer-executed method 380 for performing an HTTP push function can comprise connecting 382 the plurality of devices to a plurality of push servers, sending 384 a notification request to all of the plurality of push servers, and receiving 386 the notification request at an agent device of the plurality of devices. A device management session is started 388 at the agent device in response to receipt of the notification request. All of the plurality of push servers are notified 390 to remove stored notification requests for the agent device.

Figure 4:
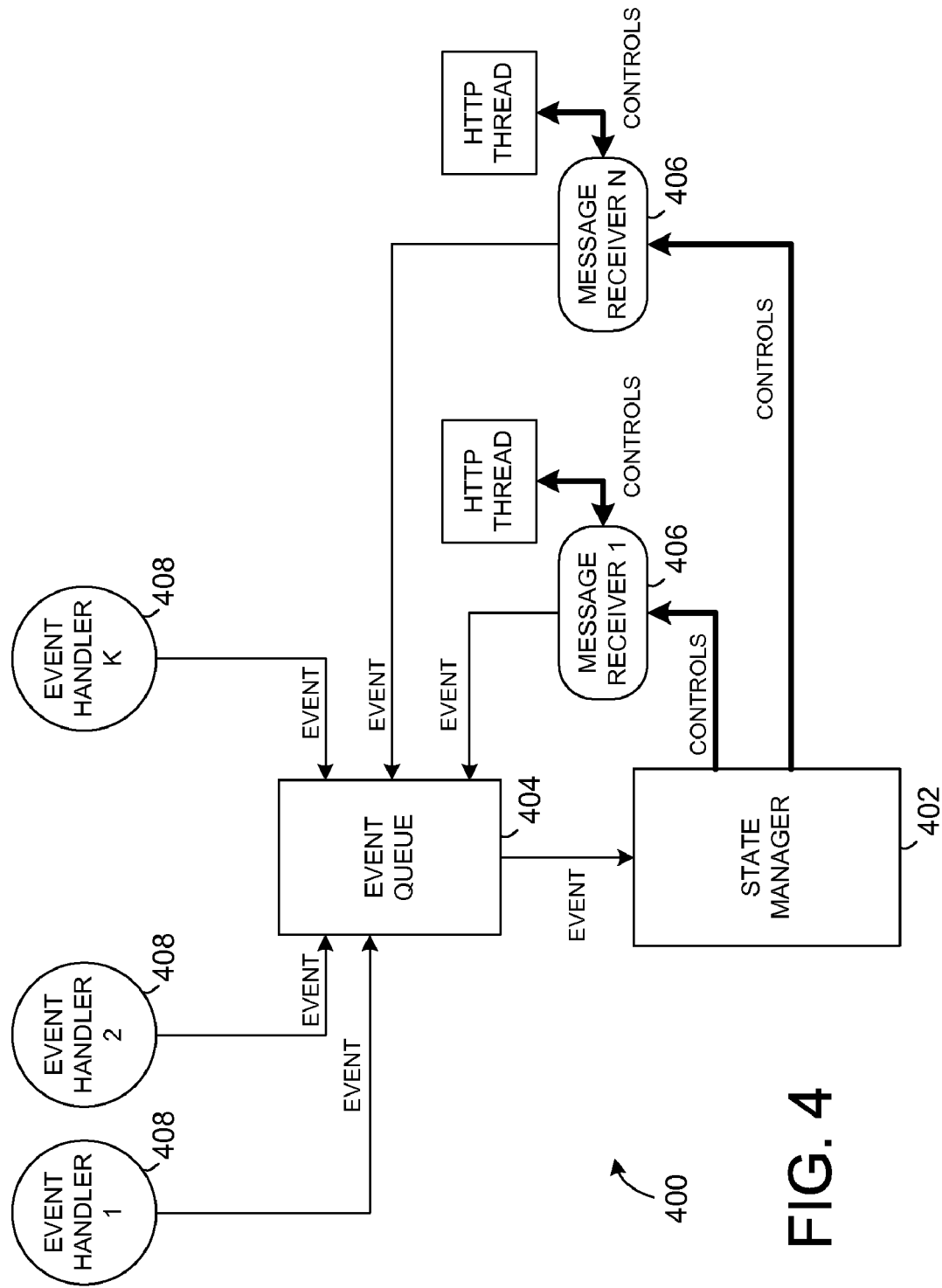
FIG. 4 is a schematic block diagram illustrating a push agent and component modules.

Referring to FIG. 4, a schematic block diagram illustrates a push agent 400 and component modules of the agent. The push agent 400 is configured according to several basic rules which are used to measure push agent quality. First, when an associated device is connected to network, the agent can receive Push messages. Second, the push agent should be ready quickly to receive Push message. Third, the message should be delivered with only a short delay. Fourth, the push agent should reduce the amount of message loss caused by a network timeout. Fifth, the push agent should recover quickly from network errors. Sixth, the push agent should have no impact on voice call and data communication. Seventh, the push agent should not dramatically consume battery in any conditions.

In an illustrative implementation, communication of the push agent with server is performed via a network that can be limited to internet or intranet. Accordingly, SMS can be eliminated as a communication resource. The push agent 400 is capable of receiving a Push message when the device is connected to the network via GPRS, Wi-Fi or USB cable. The push message can be received when device is behind firewalls and/or proxies. Since the Internet Protocol (IP) ports of HTTP/HTTPs are open on an enterprise network, communication with a server which is behind firewalls in HTTP/HTTPS is feasible. The push agent 400 sends HTTP GET commands to query and await Push messages from server.

An example embodiment can interact using a defined URL format wherein when a client queries a message, the client sends an HTTP GET command with an URL format such as:
http://<Address>[:<port>]/
<resource>?timeout=<timeout>&id=<id tag>:<id>.
To send in HTTPS, the URL can be:
https://<Address>[:<port>]/
<resource>?timeout=<timeout>&id=<id tag>:<id>.
The <timeout> can be the time in seconds that the server will hold the http session until a message is sent to the device. When no message is available to send after <timeout>, the server sends one space character as the message. An <id tag> is a name describing the type of device identifier (ID). For example, the unique ID of a device with <id tag>="UIQ". Parameter <id> can be the value of device ID.

Referring to FIG. 4, modules in the push agent 400 can include a state manager 402, an event queue 404, one or more message receivers 406, and several event handlers 408. The state manager 402 processes events in the event queue 404 or sleeps when no event is in the queue 404. A new event in the queue 404 wakes the sleep of state manager 402. State manager 402 can establish a GPRS connection and manage one or more message receivers 406 to receive the Push message. A receiver 406 is a module which communicates with a server independently. The state manager 402 directs a receiver 406 to connect to a particular server, sends commands of RUN and STOP. The receiver 406 posts the received message to the state manager 402 and waits for a command from state manager 402. The receiver 406 handles errors according to specified rules. The architecture of push agent 400 can support multiple receivers 406. Although one receiver in http can be sufficient, a flexible architecture with multiple receivers can be advantageous. For example, while the main receiver communicates with server in a working session time, an assistant receiver can attain a better session time without putting the main receiver in a risk of message loss. When the agent 400 is able to communicate with multiple servers 406, the agent 400 can select the best receiver to maintain connection for receiving a push message. For an international enterprise, several push servers can be deployed over the world to improve the speed of Push.

In an example implementation, the state manager 402 can operate in two modes including an active connection mode and passive connection mode. In the active mode, the state manager 402 initiates a network connection when the device is disconnected. In passive mode, the state manager 402 only monitors the status of network connection, turns on receivers when connection is available, and turns off the receivers when connection is unavailable.

Figure 5:
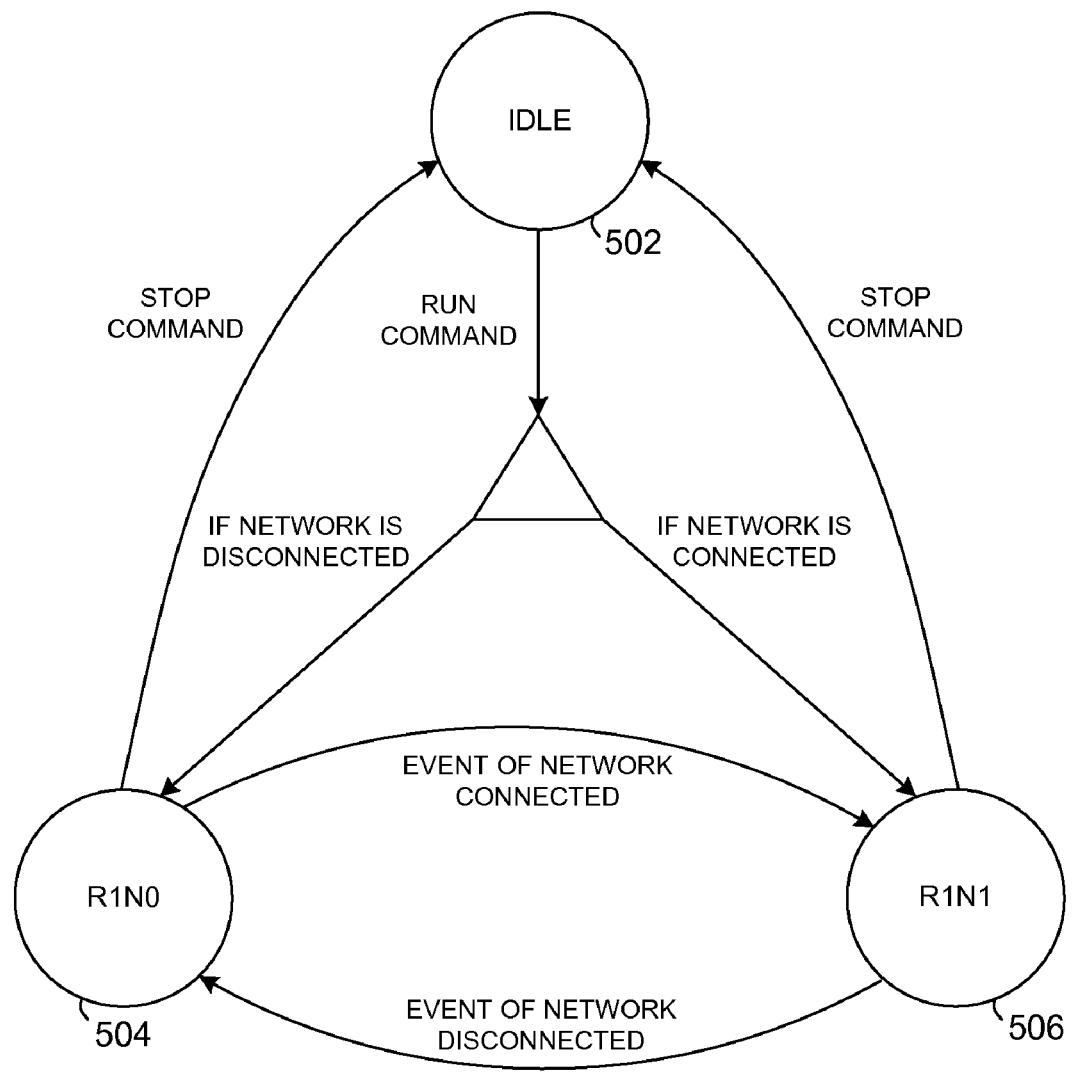
FIG. 5 is a schematic state diagram depicting states in an example embodiment of a state manager in a push agent.

Referring to FIG. 5, a schematic state diagram depicts states in an example embodiment of a state manager in a push agent. In general, the push agent has three states including an idle state 502, a R1N0 state 504, and an R1N1 state 506. In the idle state 502, the agent does nothing. In the R1N0 state 504, the push agent runs but a network 508 is unavailable. In the R1N1 state 506, the push agent runs and the network 508 is available.

In the Idle state 502, receivers are stopped. The state manager waits only for the run command.

In the R1N0 state 504, the state manager waits for connection of the network 508. If the agent is in the active mode, the state manager starts a thread which can turn on GPRS.

In the R1N1 state 506, the state manager turns on receivers and waits for messages posted from receivers. The state manager also waits for an event of network availability and turn off receivers if the network 508 is unavailable.

The illustrative state manager processes ten events including (1) a run command in which the agent is required to be turned on; (2) a stop command in which the agent is required to be turned off; (3) an exit command in which the agent is required to exit; (4) a network connected event in which the device is connected to a network; (5) a network disconnected event in which the device is disconnected to a network; (6) a network available event in which the network is available for communication; (7) a network unavailable event in which the network is unavailable for communication; (8) a GPRS registered event in which the device is registered to a GPRS network; (9) a GPRS unregistered event in which the device is unregistered to a GPRS network; and (10) a message received event in which a message is received in a receiver.

Referring to FIG. 6, a state table shows events and actions of the state manager of a push agent embodiment. On the occurrence of an event, the state manager takes actions according to the table.

Events are generated during operation of the push agent. After starting, the push agent monitors the change of registry value "run" at all times. When the value is changed to 1, a run command is generated. When the value is changed to 0, a stop command is generated.

The registry value "Exit" is also monitored at all times. When the registry value is changed to 1, an exit command is generated. The value of registry "exit" is changed to 0 in the process of an exit.

In the R1Nx states, a thread which calls API NotifyAddrChange( ) to monitor a device's local IP address is created. If the new IP address is not 127.0.0.1, a "network connected" event is generated, otherwise a "network disconnected" event is generated.

In the R1N1 state, a "network unavailable" event is generated when battery charge becomes very low, the signal is very low, or voice call is started when device is connected to GPRS. A "network available" event is generated when battery level reaches some level, the signal is sufficiently high, or a voice call is ended when device is connected to GPRS.

When a telephone is turned on and registered to a GPRS network, the status of registration can be captured by API lineSetStatusMessages( ). When GPRS is registered as HOME, or ROAM and roaming is allowed, the "GPRS registered" event is generated. When the GPRS registration is in other statuses, a "GPRS unregistered" event is generated.

The "message received" event is generated in a receiver.

Figure 7:
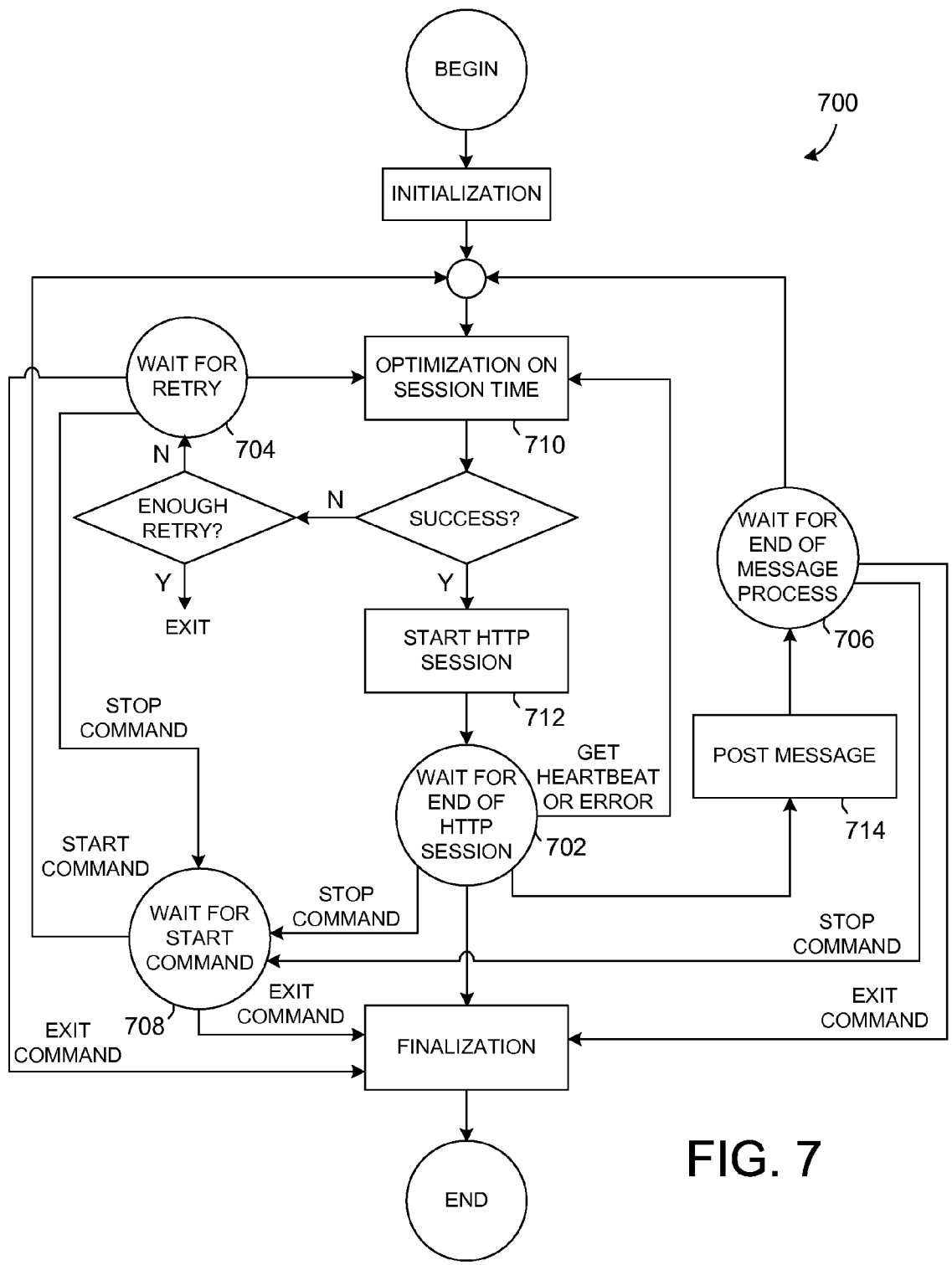
FIG. 7 is a flow chart illustrating operations of a receiver in an embodiment of a push agent.

Referring to FIG. 7, a flow chart illustrates operations of a receiver in an embodiment of a push agent. The illustrative receiver can communicate with a server in HTTP or HTTPS. The push agent can include only a single receiver or multiple receivers in various embodiments.

The receiver 700 has four waiting states including wait for response from server 702, wait for a retry 704, wait for the end of message processing 706, and wait for a start command 708.

After the optimization unit finds an http session time 710, the http session is started 712. If the session ends with a heartbeat or an error code, the receiver will optimize the session time again 710. When a message is received, the message is posted out 714 and waits for an event of the end of message processing 706. When the optimization unit receives a number of failures 716, a wait for retry 704 will start. For example, for a quantity of three waits, the receiver can be awakened by a stop command and then the receiver enters a wait for start command 708. For a quantity of four waits, the receiver can be awakened up by an exit command.

A stop command is transferred from the state manager when the state manager receives an event of network unavailable, and a start command is transferred when the state manager receives an event of network unavailable.

An exit command is transferred from the state manager when the state manager receives an event of network disconnected. When the device is connected to a network, a receiver is created and started.

The device identifier (ID) is used by the push agent to communicate with a server. The device ID must be unique for all devices. For example, for Windows Mobile devices the device ID is a string with prefix "GUID:" followed by a string of the GUID of device. The device ID is found by the preload.

After installation of a push agent, the push agent is started. The push agent is started after device reboot. During start up, the agent checks the registry value "run". If the value is 1, the agent enters state R1N0 or R1N1. The agent does not exit autonomously. For test and debug purposes, the registry value "exit" can be changed to force the agent to exit.

The time of an HTTP session can be optimized to determine a maximum-length session. When a server receives an HTTP GET command from a client, the server will hold the HTTP session, but for what duration. If the HTTP session is held too long, the firewall, proxy and the APIs, which are between the server and client, will not transfer the server's response. If the time is too short, many HTTP sessions will be initialized by the client, consuming battery power and increasing data flow. The agent optimizes the session duration by finding the longest time of HTTP session which can ensure the response from server can be received.

The longest time duration of an HTTP session can be specified as $T_S$ wherein when the failure possibility of receiving response from is F(t) and t is the time duration of the HTTP session. For an acceptable failure rate f0, $T_S$ is the time for any t>$T_S$ where F(t)>f0. The push agent can determine time $T_S$. Time $T_S$ is not a constant and changes when network environment changes. The push agent can be implemented to trace the dynamic $T_S$.

The push agent works on the principle of ensuring that the HTTP session is not placed in a risk of failure for a long time, and taking some risk for searching a longer HTTP session. The agent maintains a memory of success and failure, and adjusts from the memories. The memories of success and failures can be stored as two arrays called MemSuccess and memFail. When a receiver receives a heartbeat message, the oldest successful session time is removed from array memSuccess and the new time is added into the array. When no heartbeat message is received, the oldest times are removed from both arrays, the new session time is added into memFail and the minimum session time is added into memSuccess. A receiver executes in several steps. In step 1, all time in memSuccess is the minimum session time and all time in memFail is the maximum session time. In step 2, the time of first http session is found as the average time of memSuccess (T0), and the time of last http session is found as the least time in memFail (T1). If N http sessions are expected to succeed between times T0 and T1, the http sessions are T0+n*Step, where n=0, . . . , N−1; and Step=(T1−T0)/N. In step 3, an http session is started with time as T0. If a heart beat is received, the success/failure memories are updated, the session time is increased by Step, and step 3 is repeated. In step 4, the success/failure memories are updated for a failure condition. If all times in the memSuccess are the minimum time, which means all sessions with minimum time failed, go to step 5, otherwise go to step 2. In step 5, the server cannot be connected so that the agent enters a sleep state, then goes to step 1.

When the network is changed, the $T_S$ may be increased substantially. To enable the agent to receive the new $T_S$, step 3 can be modified to quickly increase session time if the current successful time is greater than the least time in memFail.

In step 2, the step if very small can be set to a minimum step size which is defined in the registry. When a minimum step is set, the first http session time T0 is calculated as T0=T1−N*Step or T0 is the minimum http session time. The number N is calculated from the acceptable failure possibility, N=1/f0. For example, if a 20% heartbeat not being received is allowed, N=1/0.2=5.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller and executable by a processor for handling media content and aggregating media content from a client of a plurality of clients onto a server.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A controller-executed method for performing a Hypertext Transfer Protocol (HTTP) push function comprising:
   receiving, by push server logic executing in a push server, an HTTP request containing parameters including a device identifier (ID) of a sending agent device and a timeout specifier specifying a timeout interval;
   holding open, by the push server logic, HTTP connections of all of a plurality of devices including the sending agent device until either expiration of the timeout interval or interruption by a notification request from the push server;
   sending, by the push server logic, an empty body if no messages are present for the sending agent device during the timeout interval;
   receiving, by the push server logic, an interrupt from the push server if a message is present for the sending agent device;
   responding, by the push server logic, to the interrupt by returning a trigger message to the sending agent device and completing HTTP request processing;
   if a trigger message is received from the push server before the sending agent device is connected to the push server, storing, by the push server logic, the trigger message from the push server in an HTTP push memory;
   connecting, by the push server logic, the sending agent device to the push server; and
   returning the stored trigger message to the push server upon connection.

2. The method according to claim 1 further comprising:
   responding to the trigger message at the sending agent device comprising:
   starting a device management session with a device management server.

3. The method according to claim 1 further comprising:
   repeating all of multiple message cycles with a same HTTP connection for maintaining a connection at the sending agent device.

4. The method according to claim 1 further comprising:
   connecting the plurality of devices to a plurality of push servers;
   sending a notification request to all of the plurality of push servers;
   receiving the notification request at a particular device of the plurality of devices;
   starting a device management session at the particular device in response to receipt of the notification request; and
   notifying all of the plurality of push servers to remove stored notification requests for the particular device.

5. The method according to claim 1, further comprising:
   sending, by the push server logic, the message to the sending agent device to simulate a session initiated by the push server,
   wherein the received HTTP request is an HTTP GET request.

6. A controller-executed method for performing a Hypertext Transfer Protocol (HTTP) push function comprising:
   receiving, by push server logic executing in a push server, an HTTP request specifying parameters including a device identifier of a sending agent device and a timeout specifier, wherein the sending agent device is operated in a roaming mode, and wherein HTTP push functionality is disabled when the sending agent device is operated in the roaming mode;
   holding open, by the push server logic, HTTP connections of all of a plurality of devices including the sending agent device until either expiration of a timeout or interruption by a notification request from the push server;
   sending, by the push server logic, an empty body if no messages are present for the sending agent device during a timeout interval;
   receiving, by the push server logic, an interrupt from the push server if a message is present for the sending agent device; and
   responding, by the push server logic, to the interrupt by returning a trigger message to the sending agent device and completing HTTP request processing.

7. A controller-executed method for performing a Hypertext Transfer Protocol (HTTP) push function comprising:
   receiving, by push server logic executing in a particular push server, an HTTP request specifying parameters including a device identifier of a sending agent device and a timeout specifier, wherein the sending agent device is connectable to a plurality of push servers by randomly selecting from among the plurality of push servers, determining whether the selected push server is busy, if the selected push server is busy, selecting a different push server, and if the selected push server is not busy, connecting to the selected push server;
   holding open, by the push server logic, HTTP connections of all of a plurality of devices including the sending agent device until either expiration of a timeout or interruption by a notification request from the particular push server;
   sending, by the push server logic, an empty body if no messages are present for the sending agent device during a timeout interval;
   receiving, by the push server logic, an interrupt from the particular push server if a message is present for the sending agent device; and responding, by the push server logic, to the interrupt by returning a trigger message to the sending agent device and completing HTTP request processing.

8. A controller-executed method for performing a Hypertext Transfer Protocol (HTTP) push function comprising:
receiving, by push server logic executing in a first push server, an HTTP request specifying parameters including a device identifier of a sending agent device and a timeout specifier, wherein the sending agent device is connectable to a plurality of push servers including the first push server;
holding open, by the push server logic, HTTP connections of all of a plurality of devices including the sending agent device until either expiration of a timeout or interruption by a notification request from the first push server;
responding to the timeout by disconnecting the sending agent device with the first push server maintaining sending agent device information in memory until an exception after the timeout, wherein the timeout causes connection of the sending agent device to a second push server;
sending, by the push server logic, an empty body if no messages are present for the sending agent device during a timeout interval;
receiving, by the push server logic, an interrupt from the push server if a message is present for the sending agent device; and
responding, by the push server logic, to the interrupt by returning a trigger message to the sending agent device and completing HTTP request processing.

9. A mobile device comprising:
a processor; and
a push agent logic executable on the processor to:
send a GET command to a server over a network, wherein the GET command includes a mobile device identifier parameter and a timeout parameter designating a maximum time interval for the server to reply with a message, wherein the push agent logic is configured to send the GET command repeatedly to the server to maintain a capability to receive a push message from the server over the network;
wherein the mobile device is operable in a roaming mode and HTTP push functionality is disabled when the mobile device is operated in the roaming mode, and wherein the mobile device is configured to receive the push message while the mobile device is operated in the roaming mode.

10. The mobile device according to claim 9 wherein the push agent logic comprises:
an event queue;
a state manager to process events in the event queue, wherein the state manager is inactive in a condition of no event in the event queue; and
at least one receiver configured to independently communicate with the server, connect to the server identified by the state manager, post a received message to the state manager, and wait for a command from the state manager, wherein the state manager is operative to establish a network connection and manage the receiver to receive the push message.

11. The mobile device according to claim 9, wherein the GET command is a Hypertext Transfer Protocol (HTTP) GET command.

12. The mobile device according to claim 9, wherein the push agent logic is configured to further:
randomly select from among a plurality of servers;
determine whether the selected server is busy;
if the selected server is busy, select a different server; and
if the selected server is not busy, connecting to the selected server to send the GET command.

13. The mobile device according to claim 9, wherein the server is a first server, and wherein the push agent logic is configured to further:
disconnect the mobile device from the first server in response to expiration of the timeout interval at the first server; and
after the disconnecting, connect the mobile device to a second server.

14. A push server comprising:
a processor; and
a push server logic operable in the push server to send a message to a mobile device over a network, the push server logic executable on the processor to:
receive a GET command from the mobile device, wherein the GET command includes a mobile device identifier parameter and a timeout parameter designating a maximum time interval for the push server to reply with the message;
hold a GET command session until expiration of a timeout designated by the timeout parameter in a condition that no message is targeted to the mobile device; and
terminate the GET command session by sending the message in a condition that the message is targeted to the mobile device;
wherein the push server logic is operable to send the message to the mobile device that is operable in a roaming mode, where HTTP push functionality is disabled when the mobile device is operated in the roaming mode, and wherein the push server logic is operable to send the message to the mobile device while the mobile device is operated in the roaming mode.

15. The push server according to claim 14 wherein the push server is operable in a distributed and modular manner wherein the push server executes and is scalable independently of an associated push-enabled application.

16. The push server according to claim 14 wherein the push server logic is executable to receive the GET command that is repeatedly sent by the mobile device.

17. The push server according to claim 14, wherein the GET command further includes an identifier of the mobile device, and wherein the push server logic is executable to further:
hold open HTTP connections of all of a plurality of mobile devices including the mobile device that sent the GET command until either expiration of the timeout interval or interruption by a notification request from the push server;
send an empty body if no messages are present for the mobile device that sent the GET command during the timeout interval;
receive an interrupt from the push server if a message is present for the mobile device that sent the GET command; and
respond to the interrupt by returning a trigger message to the mobile device that sent the GET command and completing HTTP request processing.

18. The push server according to claim 14, wherein the GET command is a Hypertext Transfer Protocol (HTTP) GET command.

* * * * *